May 3, 1955     W. M. KAUFFMAN     2,707,602
SIDESLIP STABILIZING SYSTEM
Filed March 2, 1950                          2 Sheets-Sheet 1

Inventor
WILLIAM M. KAUFFMAN

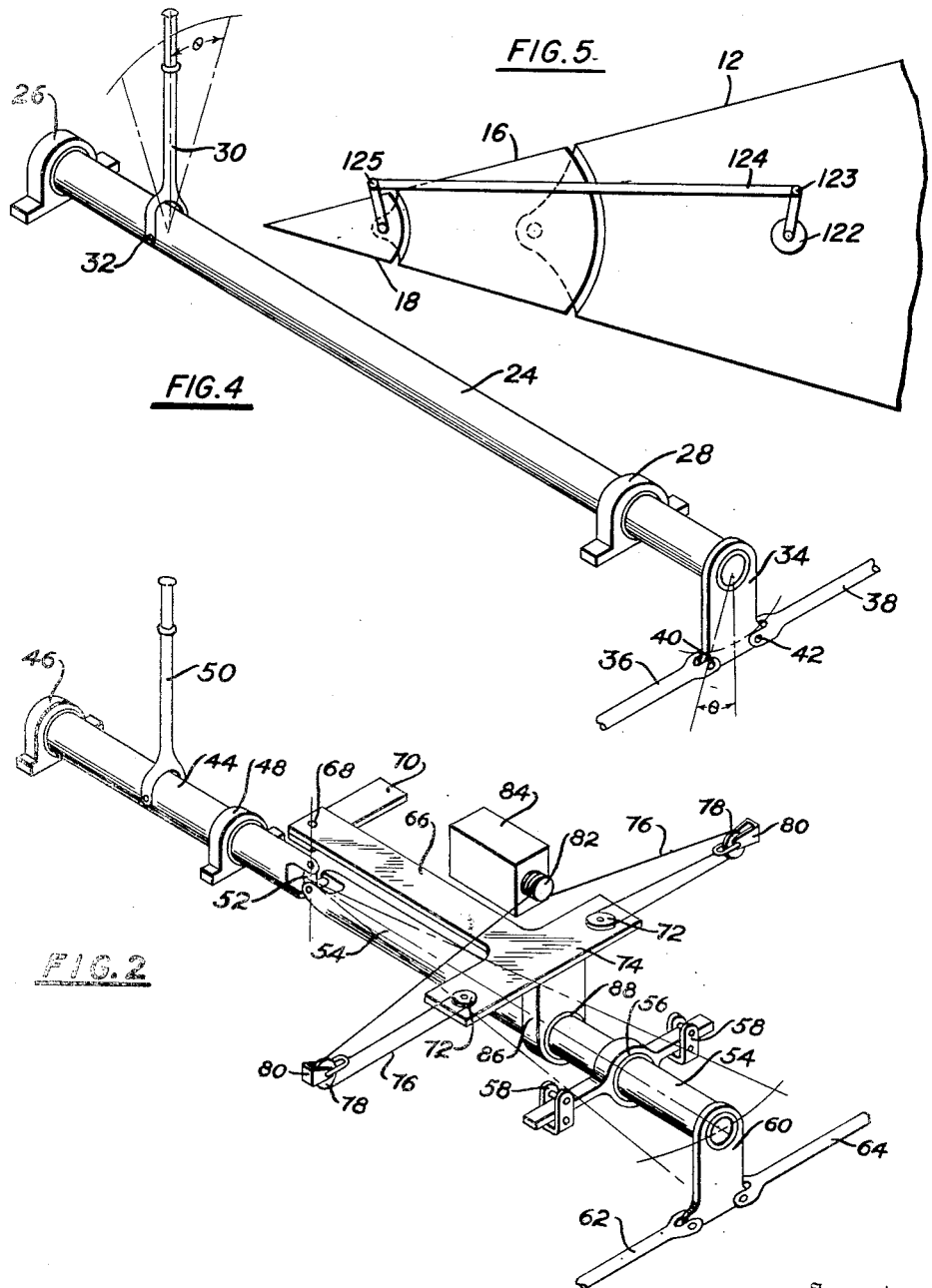

United States Patent Office 2,707,602
Patented May 3, 1955

2,707,602

SIDESLIP STABILIZING SYSTEM

William M. Kauffman, Mountain View, Calif.

Application March 2, 1950, Serial No. 147,314

13 Claims. (Cl. 244—77)

(Granted under Title 35, U. S. Code (1952), sec. 266)

This invention relates to apparatus for varying in flight the stability characteristics of an aircraft. In particular the invention relates to means of servo-actuation of control surfaces to improve these stability characteristics.

According to the present improvements, the effective dihedral of an airplane in flight, and while under the manual control of the pilot, may be automatically varied as by a servo-motor apparatus to improve the lateral stability of the airplane. This automatic variation of the effective dihedral is accomplished through manipulation of ailerons which are simultaneously operatively connected to the pilot's manual controls. The result is that there is a super-imposition of the effects of the manual and automatic controls on the ailerons. The automatic control functions in response to sideslip angle during flight.

As will be seen, the apparatus functions in flight in such a manner that the pilot is not conscious of the source of the effective dihedral, but only of the effective over-all value as indicated to him by the response of the airplane and by the lateral stick forces and deflections required in certain maneuvers such as steady sideslips. In short the net effect on the pilot is approximately the same whether changes in effective dihedral are brought about by this apparatus or through adjusting physical parameters such as wing geometric dihedral.

This important feature is provided for by the automatic operation of a trim tab mounted on one of the ailerons. The actuator for the trim tab is combined with that of the above mentioned automatic control and is also ultimately responsive to an error signaling means which in turn is responsive to the angle of sideslip during flight.

The ability to vary the effective dihedral of an airplane during flight in accordance with the present improvements enables the pilot to have sufficient aileron deflection for normal maneuvering and emergency control and provides an enlarged scope of airplane design within tolerable limits.

The general object of the invention is to provide means by which the effective dihedral of an aircraft in flight may be automatically varied to improve the lateral stability of the aircraft in flight.

It is a further object of the invention to provide automatically operated means which varies the effective dihedral in flight without changing the angular displacement of the lateral control stick and without changing the force reaction thereon.

It is an additional object of the invention to provide means which enables a pilot to fly a course accurately and steadily and for example to bring a target onto the cross hairs of a gun sight camera and to keep it there.

Other objectives, such as ruggedness of construction and reliability of performance, will be apparent from the following description and from the drawings herewith submitted which are merely illustrative a preferred embodiment of the invention and are not otherwise limitative thereto.

By "effective dihedral" as herein used, is meant the rate of change of rolling moment coefficient with angle of sideslip. It may be expressed quantitatively by the stability coefficient $C_{l\beta}$ where $C_l$ is the rolling moment coefficient and $\beta$ is the angle of sideslip in degrees.

In the drawings:

Figure 2 is an isometric view of the torque tube as modified for this invention, the servo-motor operated swinging plate, the front bearing permitting lateral horizontal displacement of the forward part of the torque tube and the tube horn with the pivotally connected aileron push rods;

Figure 4 is an isometric elevational view of the conventional torque tube, operating lateral control stick, tube horn and aileron push rods pivotally connected thereto; and Figure 5 is a diagramatic view of a portion of a wing, an aileron and a servo actuated trim tab.

Figure 1:
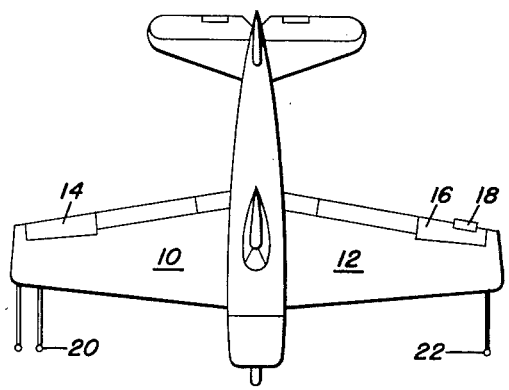
Figure 1 is a diagrammatic plan view of an airplane equipped with the apparatus of this invention and showing the location of the yaw vane.

Referring to Figure 1 of the drawings, the plan view of the aircraft shows the wings 10 and 12 provided with ailerons 14 and 16, respectively. Aileron 16 is provided with a hinged tab 18. Rotatably mounted vanes for recording and signaling the angle of sideslip are positioned at 20 and 22, respectively.

Figure 4 of the drawings shows the conventional lateral control operating mechanism comprising a torque tube 24 rotatably mounted in bearings 26 and 28. Stick 30 is mounted as at 32 on torque tube 24 and by swinging laterally of the torque tube may impart rotation thereto. Secured to the remote end of torque tube 24 is torque tube horn 34 which functions as a crank and to which aileron push rods 36 and 38 are pivotally connected as at 40 and 42. Obviously lateral deflection of stick 30 through an angle θ imparts a rotation through the same angle to tube horn 34 but in the opposite sense as here illustrated. Push rods 36 and 38 are moved linearly to the right or left depending upon the direction of rotation of tube horn 34 and the ailerons to which these push rods are connected by linkwork (not shown) are deflected either up or down in the sense opposite to each other depending on the direction of the movement of push rods 36 and 38.

Figure 2 of the drawings illustrates a modification of the conventional torque tube structure shown in Figure 4, which constitutes an important part of this invention. Here torque tube 44 is shown as rotatably mounted in bearings 46 and 48. Control stick 50 is mounted on torque tube 44 in the same manner as stick 30 in Figure 4. Forward of bearing 48 torque tube 44 is provided with an universal joint 52 which permits rotation of tubular part 54 of torque tube 44 by control stick 50 under all conditions of angularity of part 54 with respect to torque tube 44. Near its forward end tubular part 54 is rotatably mounted in bearing 56 which is constructed to prevent vertical movement of tubular part 54 but to permit lateral movement thereof in roller guides 58. To the forward end of tubular part 54 torque tube horn 60 is firmly attached as in the case of tube horn 34 in Figure 4. Aileron push rods 62 and 64 are pivotally connected to torque tube horn 60 in a manner similar to that of push rods 36 and 38 in Figure 4.

Swinging plate 66 is pivotally mounted as at 68 on fixed bracket 70. The axis of pivot 68 is in vertical alignment with the vertical axis of universal joint 52. Swinging plate 66 may be of any configuration but is here shown as T-shaped. Pulleys 72 are rotatably mounted near the ends of cross-bar 74 of T-shaped swinging plate 66. Cable 76 may be fed around these pulleys, thence around sheaves 78 rotatably mounted in fixed blocks 80 at quarter turn position with respect to pulleys 72 and thence around winding drum 82 which is driven by aileron servo-motor 84. Cable 76 is wound around winding drum 82 so that rotation of the drum in a clockwise direction as viewed in Figure 2 pulls cable 76 in from the right hand side and pays the cable out to the left hand side thereby rotating swinging plate 66 to the right (counterclockwise about pivot 68 as viewed in Figure 2). Obviously rotation of drum 82 in a counterclockwise direction moves swinging plate 66 in a clockwise direction about its pivot. Swinging plate 66 is provided with a rigidly attached lug 86 which has a bearing support 88 in which tubular torque rod 54 is freely rotatable. Rotation of swinging plate 66 in a clockwise or counterclockwise direction about pivot 68 therefore rotates tubular torque rod part 54 about the vertical axis of universal joint 52 which axis is coaxial with pivot 68 and moves aileron push rods 62 and 64 linearly to the left or right as the case may be. Lateral movement of aileron push rods 62 and 64 as here described moves the ailerons to which they are connected in the opposite sense with respect to each other. It is therefore seen that rotation of the aileron servo-motor 84 changes the angle of deflection of the ailerons with respect to each other independently of and without changing the angle of deflection of the control stick.

When an airplane sideslips in flight the hinge moments of the ailerons are unequal and there is a reactive force exerted on the control stick. In order to reduce this force of reaction at the control stick to zero the invention provides means on one aileron (the left in this instance) which reduces or increases the hinge moment of this aileron to an approximate balance with the hinge moment exerted by the other aileron and there is no resultant force exerted at the control stick. The means employed consists essentially of a tab hingedly mounted on the trailing edge of the left wing aileron as shown at 18 in Figure 1. This tab is deflected in the sense opposite to that of aileron 16 to which it is attached, thereby compensating for the change in hinge moment produced by the servo-motor deflection of the ailerons. This tab is operated by a servo-motor 122 and interconnecting push rod, the servo-motor 122 being responsively controlled through a primary selsyn connected through a differential gearing to the aileron servo-motor 84 above described. As will be seen from Fig. 5, the servo-motor 122 is operatively connected to the tab 18 by crank 123 and push rod 124 which connects said crank to an ear 125 on the hinge of the tab. The deflection of the tab therefore follows the deflection of the aileron and is proportional thereto but in the opposite sense.

Figure 3:
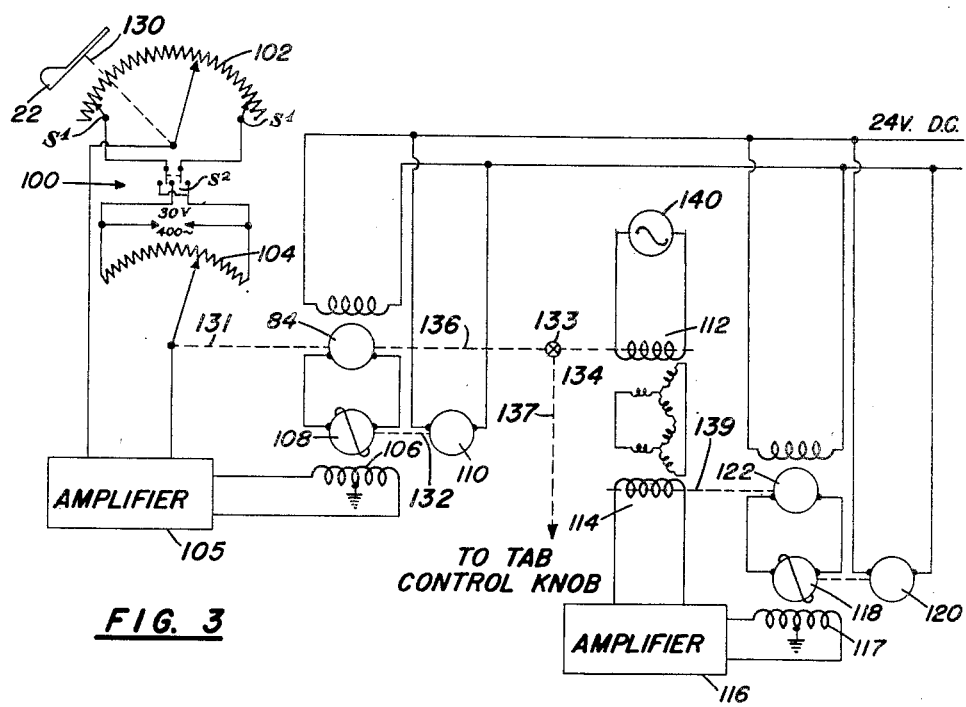
Figure 3 is an electrical circuit diagram of the dihedral-effect control apparatus.

A clearer understanding of this interrelation of the operation of the two servo-motors may be had by reference to the wiring diagram shown in Figure 3, wherein the error measuring portion of the aileron servo mechanism is shown generally at 100 and may consist essentially of a two potentiometer bridge circuit with a 30 volt, 400 cycle power supply. Potentiometer 102 is geared mechanically by means 130 to yaw vane 22. The other potentiometer 104 is connected to servo-motor 84 by suitable means 131. With yaw vane 22 and servo-motor 84 initially neutral, the bridge circuit is at one balance point. When vane 22 is deflected through an angle of sideslip $\beta$, an error signal is supplied by the bridge to amplifier 105. It should be noted at this point that the word amplifier is used in its broad sense as a unit which may amplify and produce a D. C. output such as by introducing proper biasing and components into the amplifier stages or by the inclusion of an additional stage in the unit for the purpose of rectification. The amplified signal, converted to direct current is fed to field 106 of amplidyne generator 108, the armature of which is driven continuously through linkage 132 at constant speed by direct current amplidyne motor 110. The generator output voltage, of a polarity and magnitude determined by the error signal, is applied to the armature of reversible, separately excited, direct current aileron servo-motor 84. Aileron servo selsyn 112 is linked to differential 133 through linkage 134, the differential 133 receiving one input from aileron servo-motor 84 through differential input means 136 and receiving a second input from a tab control knob (not shown) through differential input means 137. The generator output voltage determines the direction and speed of the servo-motor rotation, which moves torque tube part 54 and the contact of potentiometer 104 in the direction which tends to balance the bridge circuit at a new point corresponding to $\beta$ and servo aileron deflection $(\Delta a)_s$. The servo gearing, i. e., the ratio of the partial derivative of the aileron deflection with respect to the angle of sideslip $(\partial \delta_a/\partial \beta)_s$ can be altered through selector switches $s_1$, which in effect varies the bridge unbalance per degree of sideslip. The sign of $(\partial \delta_a/\partial \beta)_s$ and thus $(\Delta C_{l\beta})_s$, where $(C_{l\beta})_s$ is the rate of change of rolling-moment coefficient with the angle of sideslip $(\partial C_l/\partial \beta)$, per degree, can be reversed by switch $s_2$.

With reference to aileron tab drive and servo mechanism as shown by Figure 3, the ratio $(d\delta_t/d\delta_a)_s$ of the tab motion to aileron motion required to balance the hinge moment due to servo-actuated aileron motion was determined from preliminary flight tests. Insufficient total power of the original trim tab necessitated an increase of both the area and control throw of the tab which was located as indicated in Figure 1 on the left aileron. Flight tests indicated this revised tab yielded a $(d\delta_t/d\delta_a)_s$ value of minus 1.15 which was thereafter used in test flights. It was not possible to use the aileron servo-motor to drive the tab because of excessive lost motion in the tab linkages between the cockpit and the tab surface. Therefore a separate servo-motor was installed in the left wing to drive the tab more directly.

As seen in Figure 3 of the drawings, the tab servo-electrical circuit is similar to the aileron circuit, although selsyns are used in place of potentiometers in the signal network. Error signals arising from rotation of the selsyn attached to the aileron servo result in motions of the tab servo and selsyn which tend to reduce the error to zero. More particularly, the signal received from aileron servo selsyn 112 by tab servo selsyn 114 is amplified and rectified by amplifier 116 and impressed upon tab amplidyne exciter coil 117 which is the exciter coil of amplidyne generator 118. The armature of this generator is continuously driven by motor 120. Aileron servo selsyn 112 may be excited by conventional A. C. source 140 which may be a 115 volt, 400 cycle source. Upon excitation of the field of generator 118 by the amplified signal, current is delivered to the field of tab servo-motor 122, the rotation of the armature of which rotates the armature of tab servo selsyn 114 through means 139 thereby tending to reduce the received signal to zero and deflecting tab 18 in a direction to offset the change in hinge moment produced by the deflection of aileron 16.

The operation of apparatus constituting this invention is obvious from the foregoing description. In general the device operates automatically upon indication of a sideslip of the airplane in flight by a vane positioned on the aircraft so as to be deflected when the aircraft sideslips. The deflection of this vane causes the ailerons to be deflected by a servo-motor to exert a rolling moment proportional to the sideslip, and in such a direction as to oppose or to augment, as desired, the inherent rolling moment due to sideslip. The servo deflection of the ailerons does not change the angle of deflection of the control stick nor is the change in hinge moment due to the servo deflection of the ailerons reflected as a change in force at the control stick. This compensation of the hinge moment is brought about by opposing deflection of a servo-actuated tab positioned in the trailing edge of one of the ailerons.

Tests of the apparatus of this invention for varying the dihedral effect of a conventional fighter-type airplane which normally is provided with the aileron control system shown in Figure 4, have shown that the device permits large changes in stick-fixed and stick-free dihedral effect to be made readily in flight. Successful tests have been conducted over an effective-dihedral-angle range from 14.9° to minus 2.70°.

While there is disclosed a particular form of apparatus adaptable for operation with a particular type of lateral control of an aircraft in flight it is not desired to be strictly limited thereto beyond the definition of the herewith appended claims since one skilled in the art could make structural changes both in the apparatus and in the electric control circuit and elements without departing from the spirit and scope of the invention.

The invention described herein may be manufactured and used by or for the Government of the United States of America for governmental purposes without the payment of any royalties thereon or therefor.

What is claimed is:

1. In an aircraft provided with ailerons, a manually operable assembly for actuating the ailerons and connected to the latter, a device for producing an electrical signal proportional to the aircraft angle of sideslip while in flight, means mechanically connected to a portion of said assembly and responsive to the reception of a signal produced by said signal producing device for moving said ailerons in a direction to counteract the sideslip, a tab carried by one of the ailerons, and means operatively associated with said tab and responsive to actuation of said aileron moving means for operating said tab in a direction to cancel any reaction from said aileron moving means, to thereby prevent impediments in the manual operation of said assembly.

2. An aircraft control system comprising a pair of ailerons, pilot operated means for actuating the ailerons including a first tube portion to which a control stick is attached and a second tube portion, a universal joint connecting confronting ends of said tube portions so that the second portion may be laterally displaced with respect to the first tube portion, linkages connecting said second portion with said ailerons, means responsive to aircraft sideslip angle for altering the effective aircraft dihedral, said dihedral altering means including a signal producing device responsive to sideslip angle, signal responsive means connected with said second portion for laterally displacing said second tube portion thereby moving said ailerons independently of motion of said first tube portion, so that any instantaneous amount of aileron deflection is proportional to two independently applied forces, one being that caused by said pilot operated means and the other force being proportional to the instantaneous sideslip angle.

3. The combination of claim 2 and a tab connected to one of the ailerons, means responsive to actuation of said second tube portion displacing means for actuating said tab an amount proportional to said other force which is a function of sideslip angle so as to counteract in said pilot operated means the hinge moments caused by the aileron deflection resulting from operation of said second tube laterally displacing means.

4. The combination with an aircraft having ailerons and pilot operated means to actuate the ailerons comprising; means responsive to aircraft sideslip for generating a signal proportional to the sideslip angle, means connected to the pilot operated means but operable independently of said pilot operated means, for actuating the ailerons without reaction in said pilot operated means in response to a generated signal, means operatively associated with said signal generating means to null said signal when said ailerons are actuated by the independently operable means, a tab connected to one of said ailerons and operable to correct for hinge moments introduced by the adjustment of said ailerons by said independently operable means, and means responsive to the actuation of said ailerons caused only by said independently operable means for deflecting said tab.

5. In an aircraft provided with ailerons, a tab on one aileron, a pilot actuated control assembly for the ailerons, a sensing device and signal producing device responsive to the angle of aircraft sideslip, means operable independently of pilot operation of the pilot control assembly and responsive to a signal from the signal producing device for deflecting the ailerons an amount which is a function of the angle of sideslip, and means responsive to the deflection of said ailerons that is caused by said aileron deflecting means, for actuating said tab, whereby only the hinge moments introduced by the aileron deflection due to sideslip angle generated stimuli are counteracted.

6. In an aircraft having ailerons, a pilot actuated control assembly for the ailerons, a sideslip angle sensing device, a signal producing device operatively associated with said sensing device for producing signals proportional to the angle of sideslip, a servomotor drivingly connected with one of the ailerons, means operatively connected with said device and motor for converting the signals of the device to current for actuating said servomotor, a tab carried by the last-mentioned aileron, a tab motor drivingly connected with said tab, and means responsive to actuation of said servomotor and connected with said tab motor to energize the latter so that tab actuation operates against pilot actuated aileron control and is responsive to servomotor aileron control actuation.

7. The combination of claim 6 and said assembly including a pair of tube portions, a universal joint connecting the portions, and said servomotor being connected with one of said portions to shift it in actuating said aileron.

8. In an aircraft having ailerons, a control system comprising a sideslip angle sensing device and signal generator connected therewith for producing signals proportional to the sensed sideslip angle, an aileron motor drivingly connected to an aileron and operatively connected to the signal generator in order that the aileron is actuated in response to signals generated and independently of pilot manual control, and means operatively connected with said motor and the aileron for cancelling the hinge moment of said aileron produced by movement of the aileron caused by said motor.

9. In an aircraft having ailerons to one of which there is a tab fastened, a control system for superimposing automatic control actuation of the tab and ailerons in addition to pilot control, said system comprising a balanced bridge circuit having a first potentiometer, sideslip angle responsive means for adjusting the potentiometer to produce signals proportional to sideslip angle and unbalance the bridge circuit, an aileron motor drivingly connected with the ailerons to actuate the latter, means connecting said motor in said circuit for actuation of the motor in response to signals produced therein, a second potentiometer in said bridge circuit mechanically connected with said motor and responding to balance said bridge circuit at a new point when operated by said motor, and means connected to said motor and said tab to actuate the tab in response to operation of said motor.

10. In an aircraft having ailerons to one of which there is a tab fastened, a control system for superimposing automatic control actuation of the tab and ailerons in addition to pilot control, said system comprising a balanced bridge circuit having a first potentiometr, sideslip angle responsive means for adjusting the potentiometer to produce signals proportional to sideslip angle and unbalance the bridge circuit, an aileron motor drivingly connected with the ailerons to actuate the latter, means connecting said motor in said circuit for actuation of the motor in response to signals produced therein, a second potentiometer in said bridge circuit mechanically connected with said motor and responding to balance said bridge circuit at a new point when operated by said motor, a tab actuating motor connected with said tab, means operatively connected with said aileron motor for producing a signal in response to actuation of the latter, and means connected with said signal producing means, and the tab motor for energizing said tab motor and at the same time reducing the signal produced to zero.

11. The combination of claim 10 and a manual control tube for the ailerons consisting of a first and a second portion, means swivelly connecting said portions, and said aileron motor being connected to one of said portions to displace it with respect to and independently of the other of said portions.

12. In an aircraft having ailerons, a control system comprising a balanced bridge circuit having a first potentiometer, means responsive to aircraft sideslip angle for adjusting said potentiometer proportional to the angle thereby unbalancing the circuit and providing a signal proportioned to the unbalance, an amplifier connected with said first potentiometer for amplifying the signal produced when said circuit becomes unbalanced, a second potentiometer connected with said amplifier and forming a part of said circuit, means including a motor connected with said amplifier for actuating said ailerons an amount proportional to the sum of the signals received from said potentiometers, and mechanical means drivingly connecting said motor and said second potentiometer for rebalancing said circuit and reducing the amplifier output to zero while the ailerons are being actuated.

13. In an aircraft having ailerons, a control system comprising a balanced bridge circuit having a first potentiometer, means responsive to aircraft sideslip angle for adjusting said potentiometer proportional to the angle thereby unbalancing the circuit, and providing a signal proportional to the unbalance, an amplifier connected with said first potentiometer for amplifying the signal produced when said circuit becomes unbalanced, a second potentiometer connected with said amplifier and forming a part of said circuit, means including a motor connected with said amplifier and responsive to the output of said amplifier for actuating said ailerons an amount proportional to the sum of the signals received from said potentiometers, and mechanical means drivingly connecting said motor and said second potentiometer for rebalancing said circuit and reducing the amplifier output to zero while the ailerons are being actuated.

References Cited in the file of this patent

UNITED STATES PATENTS

| | | |
|---|---|---|
| 1,889,273 | Avery | Nov. 29, 1932 |
| 2,143,139 | Carlson et al. | Jan. 10, 1939 |
| 2,387,795 | Issersteot | Oct. 30, 1945 |
| 2,499,471 | Dunning | Mar. 7, 1950 |

FOREIGN PATENTS

| | | |
|---|---|---|
| 572,494 | Great Britain | Oct. 10, 1945 |
| 621,212 | Great Britain | Apr. 6, 1949 |